(12) United States Patent
Lin et al.

(10) Patent No.: US 11,163,593 B2
(45) Date of Patent: Nov. 2, 2021

(54) CHECKPOINTING AND RESTORING CONTAINERS TO OPTIMIZE CONTAINERIZED MANAGED RUNTIME APPLICATIONS

(71) Applicant: International Business Machines Corporation, Armonk, NY (US)

(72) Inventors: Zi Jian Lin, Ottawa (CA); Gordon Duzhou, Markham (CA); Daihee Kim, Otawa (CA); Daniel Heidinga, Ottawa (CA); Andrew Low, Stittsville (CA); Parker Lees, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 16/245,854

(22) Filed: Jan. 11, 2019

(65) Prior Publication Data

US 2020/0226024 A1   Jul. 16, 2020

(51) Int. Cl.
*G06F 11/14* (2006.01)
*G06F 9/455* (2018.01)
(Continued)

(52) U.S. Cl.
CPC ............ *G06F 9/4552* (2013.01); *G06F 8/443* (2013.01); *G06F 9/45558* (2013.01); *G06F 9/485* (2013.01); *G06F 11/1407* (2013.01); *G06F 11/1451* (2013.01); *G06F 11/1464* (2013.01); *G06F 11/1469* (2013.01); *H04L 67/34* (2013.01); *G06F 2009/45562* (2013.01); *G06F 2201/84* (2013.01)

(58) Field of Classification Search
CPC .... G06F 9/4552; G06F 11/1407; G06F 8/443; G06F 9/45558; G06F 9/485; G06F 11/1451; G06F 11/1464; G06F 11/1469; G06F 2009/45562; G06F 2201/84; H04L 67/34

See application file for complete search history.

(56) References Cited

U.S. PATENT DOCUMENTS 8,813,051 B2   8/2014   Dawson et al.
9,588,788 B1   3/2017   Ramalingam et al.
(Continued)

OTHER PUBLICATIONS

JVM JIT optimization techniques by Csakvari (Year: 2016).*
(Continued)

*Primary Examiner* — Paul M Knight
(74) *Attorney, Agent, or Firm* — Garg Law Firm, PLLC; Rakesh Garg; Michael O'Keefe

(57) ABSTRACT

Optimizing containerized applications includes receiving managed runtime code, creating a first container within a managed runtime environment, and executing the managed runtime code in the first container within the managed runtime environment. Responsive to a determination that the managed runtime environment has performed at least one optimization of the managed runtime code to create optimized managed runtime code during a first lifetime of the managed runtime environment, the first container is checkpointed into a first memory image to create a first checkpointed container including the optimized managed runtime code. The first checkpointed container is stored.

16 Claims, 7 Drawing Sheets

(51) Int. Cl.
  *G06F 8/41* (2018.01)
  *H04L 29/08* (2006.01)
  *G06F 9/48* (2006.01)

(56) References Cited

U.S. PATENT DOCUMENTS

| | | | | |
|---|---|---|---|---|
| 9,804,945 | B1* | 10/2017 | Allen | G06F 8/00 |
| 10,248,336 | B1* | 4/2019 | Koujalagi | G06F 11/1438 |
| 10,353,753 | B1* | 7/2019 | Matylitski | G06F 9/546 |
| 10,474,568 | B2* | 11/2019 | Wang | G06F 12/0238 |
| 2003/0033344 | A1* | 2/2003 | Abbott | G06F 9/4843 718/1 |
| 2008/0244544 | A1* | 10/2008 | Neelakantam | G06F 8/443 717/147 |
| 2009/0271799 | A1* | 10/2009 | Barsness | G06F 9/5072 718/106 |
| 2009/0320008 | A1* | 12/2009 | Barsness | G06F 8/443 717/151 |
| 2010/0169895 | A1* | 7/2010 | Dice | G06F 9/466 719/312 |
| 2016/0216130 | A1* | 7/2016 | Abramson | G01C 21/3626 |
| 2016/0378521 | A1* | 12/2016 | Bektas | G06F 9/45558 718/1 |
| 2017/0315795 | A1 | 11/2017 | Keller | |
| 2019/0087211 | A1* | 3/2019 | Wang | G06F 9/45504 |

OTHER PUBLICATIONS

A New Approach To Real-Time Checkpointing by Cunei (Year: 2006).*
What is "managed code"? by Microsoft (Year: 2016).*
What's the Difference Between Containers and Virtual Machines? by Wong (Year: 2016).*
JIT-Compiler-Assisted Distributed Java Virtual Machine by Zhu (Year: 2004).*
Sista: Saving Optimized Code in Snapshots for Fast Start-Up by Bera (Year: 2017).*
Guqing Xu, et al., Efficient Checkpointing of Java Software Using Context-Sensitive Capture and Replay, Sep. 2007.
Jacob Jackson, OpenFaaS: Package any Binary or Code as a Serverless Function, Oct. 9, 2017.
Running A Java app in a container, www.jetbrains.com. Dec. 16, 2017.
Runa a Java application in a Docker container, www.jetbrains.com/help/idea/running-a-app-in-a-container.html, Nov. 27, 2018.

* cited by examiner

CHECKPOINTING AND RESTORING CONTAINERS TO OPTIMIZE CONTAINERIZED MANAGED RUNTIME APPLICATIONS

TECHNICAL FIELD

The present invention relates generally to a method, system, and computer program product for optimizing managed runtime applications. More particularly, the present invention relates to a method, system, and computer program product for checkpointing and restoring containers to optimize containerized managed runtime applications.

BACKGROUND

In the recent years, Serverless computing has becoming an emerging technology in the programming world. Serverless computing is a cloud-computing execution model in which a cloud provider acts as a server and dynamically manages the allocation of machine resources. Serverless computing is an event-driven programming platform that allows users to execute code in response to an event. Typically, pricing for serverless computing is based upon the amount of resource usage by the code during execution. Among the various implementations of serverless platforms, a common method to run code is through containers.

Containers are packages that rely on virtual isolation to deploy and run applications that access a shared operating system (OS). Containers hold the components necessary to run a desired application including files, environment variables, dependencies, and libraries. Container image files are typically complete, static and executable versions of an application or service. The host OS constrains the container's access to physical resources such as CPU, memory, and storage so that a single container is not able to consume all of a host's physical resources. A container is spun up in response to an event, and the user's code is run in the container. Since keeping multiple containers up indefinitely is nonviable economically, after some time the container is taken down and removed by the host operating system.

SUMMARY

The illustrative embodiments provide a method, system, and computer program product. An embodiment of a computer-implemented method for optimizing containerized applications includes receiving managed runtime code, creating a first container within a managed runtime environment, and executing the managed runtime code in the first container within the managed runtime environment. The embodiment further includes, responsive to a determination that the managed runtime environment has performed at least one optimization of the managed runtime code to create optimized managed runtime code during a first lifetime of the managed runtime environment, checkpointing the first container into a first memory image to create a first checkpointed container including the optimized managed runtime code. The embodiment further includes storing the first checkpointed container.

Another embodiment further includes removing the first container from the managed runtime environment. Another embodiment further includes determining that a checkpointing capability is enabled for a user associated with the managed runtime code. In another embodiment, the checkpointing of the first container is responsive to the determining that checkpointing capability is enabled for the user.

Another embodiment further includes responsive to a determination that a subsequent execution of the managed runtime code is to be performed, retrieving the first checkpointed container, and creating a second container from the first checkpointed container.

In another embodiment, creating the second container from the first checkpointed container includes restoring the first memory image to the second container. Another embodiment further includes executing the optimized managed runtime code in the second container within the managed runtime environment.

Another embodiment further includes responsive to a determination that the managed runtime environment has performed at least one additional optimization of the managed runtime code during a second lifetime of the managed runtime environment, checkpointing the second container into a second memory image to create a second checkpointed container including the at least one additional optimization, and replacing the first checkpointed container with the second checkpointed container.

Another embodiment further includes removing the second container from the managed runtime environment. In another embodiment, the managed runtime environment includes a virtual machine.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
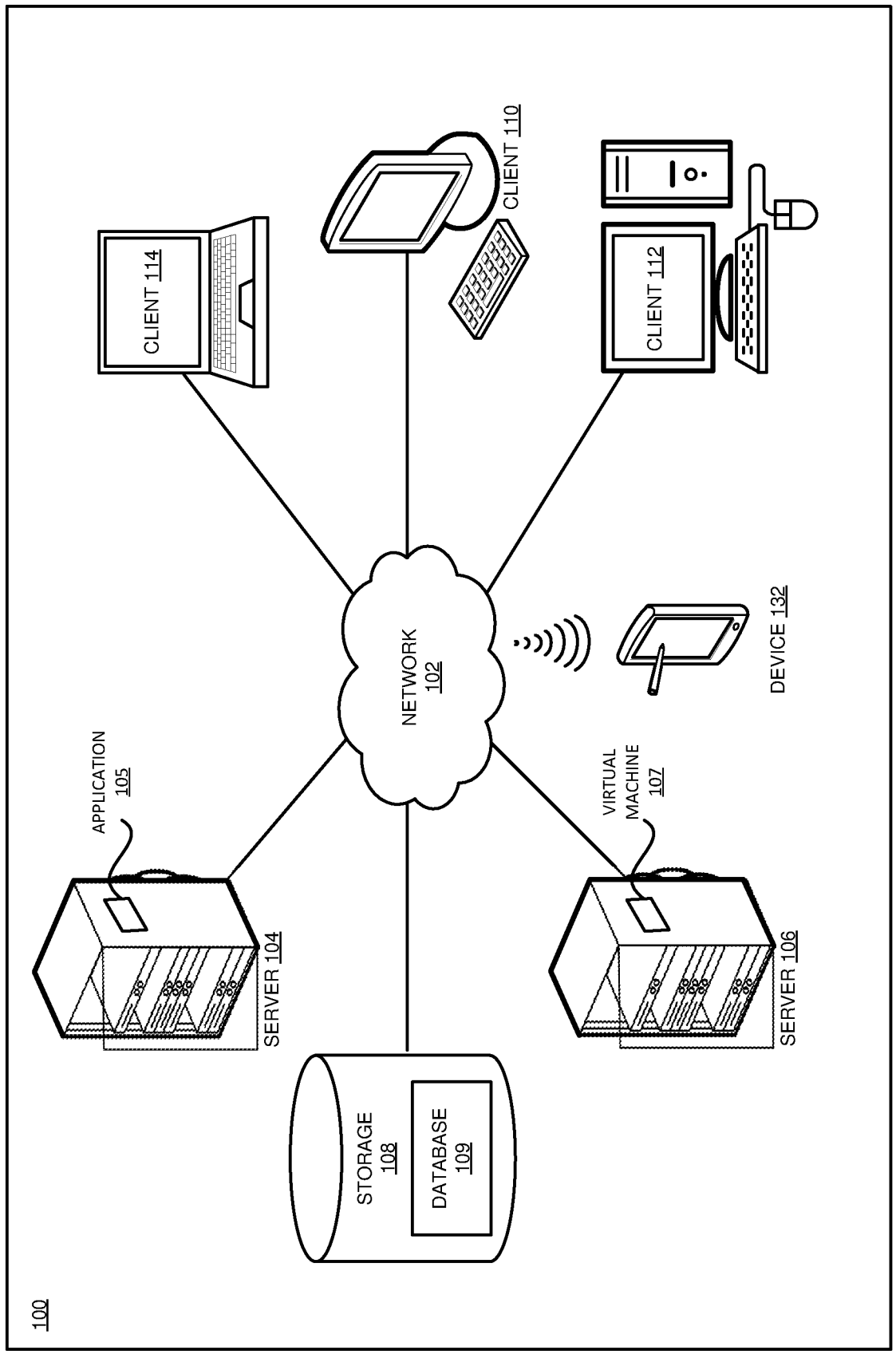
FIG. 1 depicts a block diagram of a network of data processing systems in which illustrative embodiments may be implemented.

The illustrative embodiments described herein are directed to checkpointing and restoring containers to optimize containerized managed runtime applications. One or more embodiments recognize that the serverless programming model is typically built around short-lived actions (typically less than 5 minutes) with the serverless system handling infrastructure such as scaling the user code, and providing connective services (e.g. application programming interface (API) and gateways). One or more embodiments further recognize that due to the short lived nature of the actions, the serverless model presents two major challenges: 1) "cold start" or the time to start a user action without any warm-up activity and 2) decreased peak performance due to repeated starting and stopping of the managed runtimes executing the user's action.

Managed runtime code is computer code that requires and will execute only under the management of a common language runtime virtual machine. An example of managed runtime code are as Java™ (a trademark of Sun Microsystems, Inc.) applications. For Java™ applications and other managed runtime code, the code must be executed on a virtual machine such as a Java™ virtual machine (JVM). In a Serverless environment, the JVM lives within a container. First, the JVM must start up and then load the user's Java™ code. In order to efficiently run the Java™ code, the JVM must perform optimizations. For example, Java™ code must be compiled by a just-in-time (JIT) compiler to obtain good performance. However, once the container is removed, the JVM is also removed and the optimizations performed by the JVM are lost, even though the next time that the Java™ code is executed the same optimizations will be made. Since the user action and the JVM are short lived, the same optimizations must be repeated each time the Java™ code is executed and peak performance is never reached and more aggressive optimizations for particularly important sections of code are never performed. Therefore, peak performance may never be reached. For these reasons, one or more embodiments recognize that the high overhead of the existing executing flow makes it less desirable to run Java™ code in a serverless environment.

One or more embodiments provide for an application configured to checkpoint a container in which a virtual machine running managed runtime code resides to create a checkpointed container before the container is removed. In one or more embodiments, checkpointing the container includes copying the container into a memory image to create the checkpointed container. The next time that it is necessary to create a container to execute the managed run-time code at a subsequent time, the application restores the memory image created by the checkpoint of the previous container. The restored container containing the optimizations previously performed is used for execution of the managed runtime code rather than creating a new container.

In one or more embodiments, prior to checkpointing the container, the virtual machine reports whether or not it has performed any additional optimizations during its current lifespan. If so, those optimizations can be leveraged for the next iteration of the application. Otherwise, it can be assumed that the checkpoint used for the current virtual machine is optimal and that checkpoint will be used for the next iteration.

As a result, the time that would otherwise be required to start the virtual machine as well as load the user's managed runtime code may be reduced. In addition, the procedure may also leverage the progress on optimizing the managed runtime code made by the previous container, so that additional optimizations can be performed if available. Accordingly, the procedures described herein may enable the possibility of improved performance as well as reducing the time that would otherwise be spent on performing optimizations that were already performed in previous runs of the managed runtime code. This observation enables the platform to turn a series of short runs into an equivalent long run.

In one or more embodiments, a provider of a serverless environment may implement a pricing model to provide a checkpoint/restore procedure for an application if the application is to run a sufficient number of times, or the user may be presented with an option to pay an additional fee for immediate checkpoint/restore capabilities. By paying the additional fee, the user may be able to leverage the checkpoint/restore capabilities in order to save time. Thus, one or more embodiments provide for more efficient executing of managed runtime code within a serverless environment.

In an embodiment, a system receives managed runtime code, such as code implementing an application or service, from a user and creates a container which will execute the managed runtime code. The system executes the managed runtime code which starts the virtual machine inside the container. As the code is executed, the virtual machine performs optimizations on the managed runtime code such as JIT compilation and/or other code optimizations. In particular embodiments, the optimizations include runtime optimizations of the managed runtime code. If the user has enabled checkpoint/restore capabilities, such as by paying a required fee, the system will perform the checkpointing procedure further described below. Otherwise, the system will remove the container, and the next the managed runtime code is executed will be a fresh start of the code.

After the managed runtime code has executed one or more times in the container and the container has been instructed to be removed, the virtual machine reports if it has performed optimizations during the current lifetime of the virtual machine. If optimizations have been performed during the current lifetime, the system checkpoints the container into a memory image to create a checkpointed container before removing the container. Otherwise, no additional optimizations have been done, and the system removes the container without checkpointing the container. A number of heuristics may be used to determine if additional optimizations are performed during the execution of the managed runtime code. In an example embodiment, the system monitors the JIT compiler log to determine if new method are being compiled or other optimizations are performed.

When the managed runtime code is scheduled to be executed again, the system retrieves and restores the container memory image from the checkpointed container into a new container. If no new checkpointed container was created in the most recent execution, the system uses the last created checkpointed container. Accordingly, the overhead required to start the virtual machine and load the managed runtime code is eliminated or substantially reduced. In one or more embodiments, the optimizations performed from the previous execution can be used, and more optimizations can be made in addition to the previous optimizations made during previous lifetimes of the virtual machine thereby increasing the performance of the system.

An embodiment can be implemented as a software application. The application implementing an embodiment can be configured as a modification of an existing virtual machine and/or cloud computing system or platform, as a separate application that operates in conjunction with an existing virtual machine and/or cloud computing system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
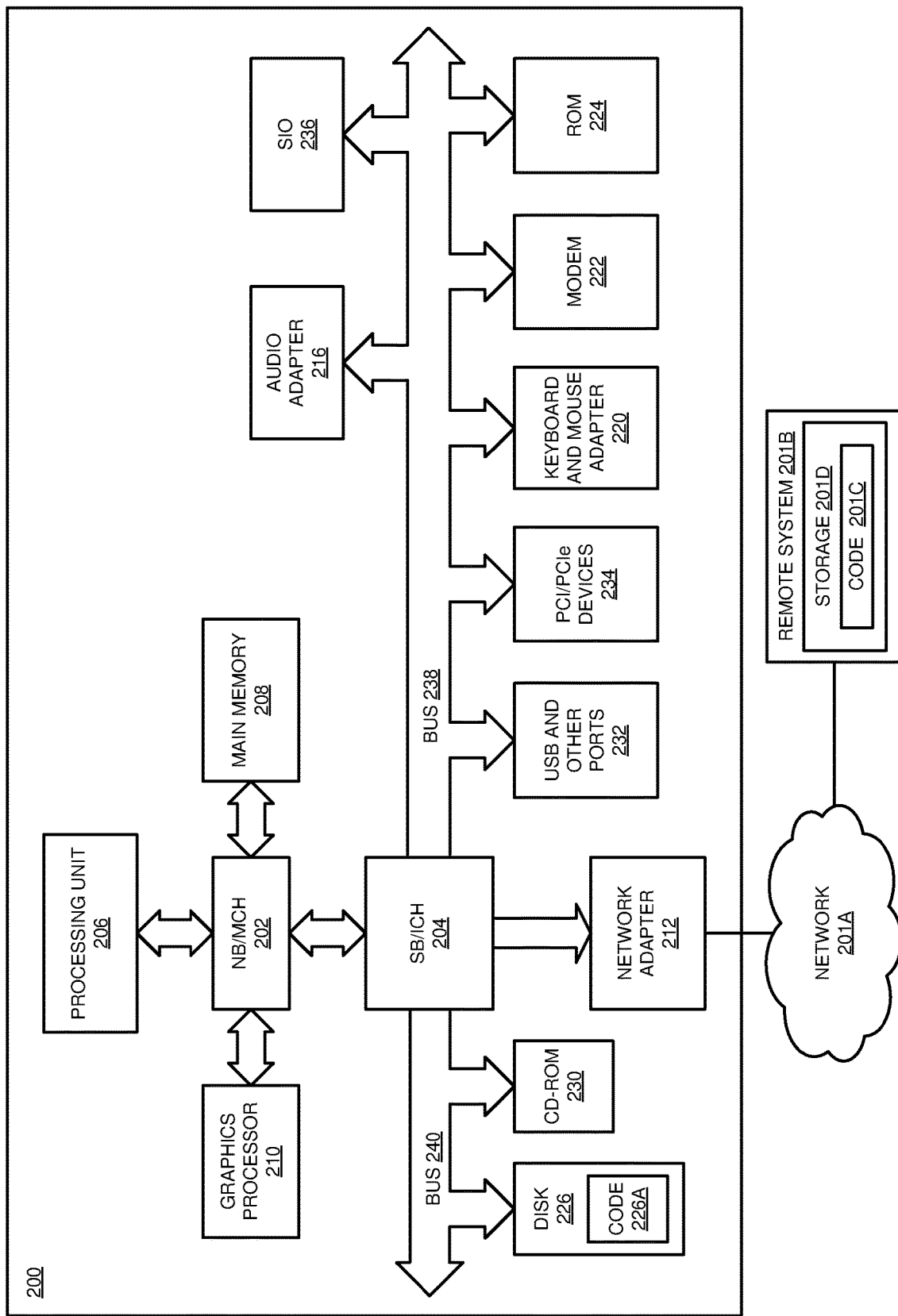
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for checkpointing and restoring containers to optimize containerized managed runtime applications in accordance with one or more embodiments.

Server 106 includes a virtual machine service 107 configured for running managed runtime code within containers as described herein with respect to various embodiments. In one or more embodiments, server 106 implements a serverless cloud computing environment. Storage device 108 includes one or more databases 109 configured to store checkpointed container data as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
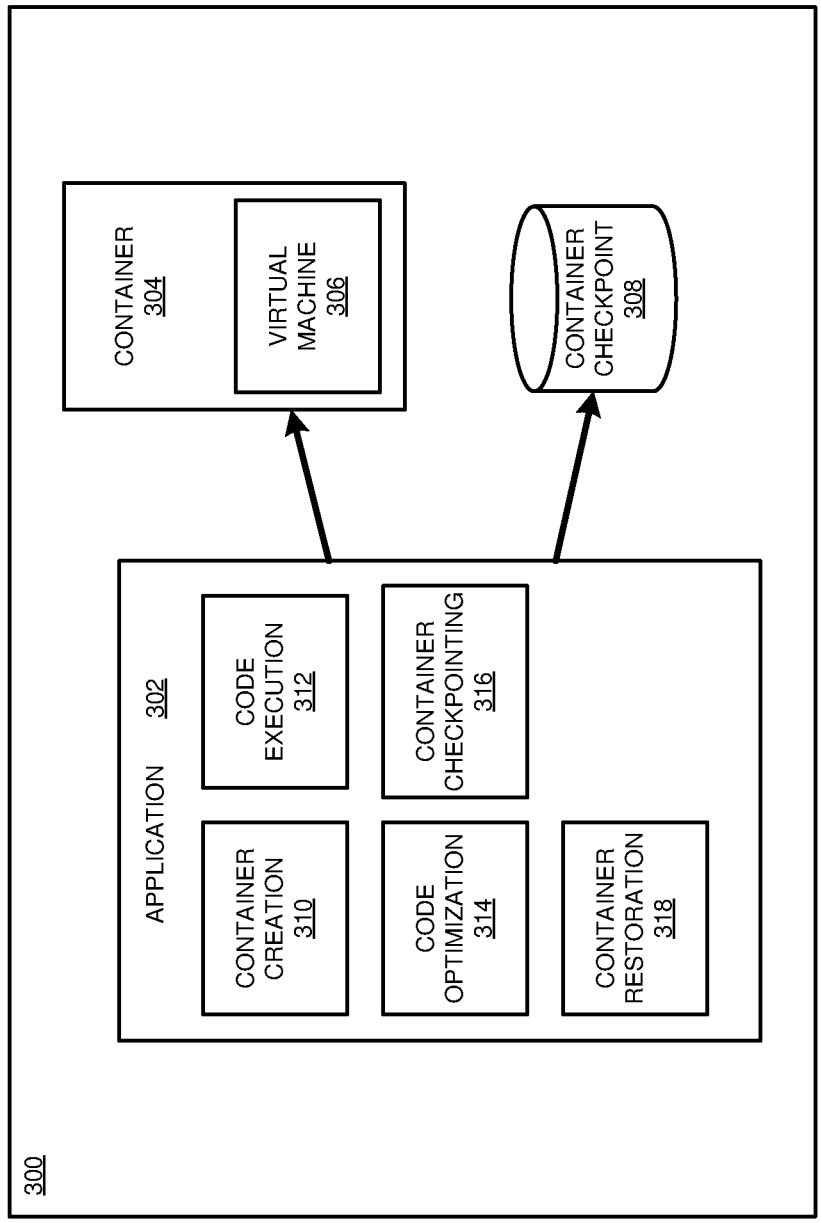
FIG. 3 depicts a block diagram of an example configuration for checkpointing and restoring containers to optimize containerized managed runtime applications in accordance with an illustrative embodiment.

With reference to FIG. 3, this figure depicts a block diagram of an example configuration 300 for checkpointing and restoring containers to optimize containerized managed runtime applications in accordance with an illustrative embodiment. The example embodiment includes an application 302. In a particular embodiment, application 302 is an example of application 105 of FIG. 1.

Application 302 is configured to receive managed runtime code and provide the managed runtime code to a container 304 for execution by a virtual machine 306 within the container 304. During execution of the managed runtime code, virtual machine 306 may perform one or more code optimizations upon the managed runtime code and provide an indication of the code optimizations to application 302. In responsive to receiving an indication of the code optimization, application 302 is configured to create a container checkpoint 308. Application 302 includes a container creation component 310, a code execution component 312, a code optimization component 314, a container checkpointing component 316, and a container restoration component 318.

In the embodiment, container creation component 310 is configured to create container 304 for executing managed runtime code within virtual machine 306 as described herein. In the embodiment, code execution component 312 is configured to initiate execution of the managed runtime code within container 304 by virtual machine 306 as described herein. In the embodiment, code optimization component 314 is configured to determine if virtual machine 306 has performed code optimization upon the managed runtime code during execution of the managed runtime code as described herein. In the embodiment, container checkpoint component 316 is configured to create container checkpoint 308 by copying container 304 into a memory image responsive to a determination that the managed runtime code has been optimized during the current execution as described herein. Container restoration component 318 is configured to retrieve and restore container checkpoint 308 to container 304 during a subsequent execution of the managed runtime code as described herein.

Figure 4:
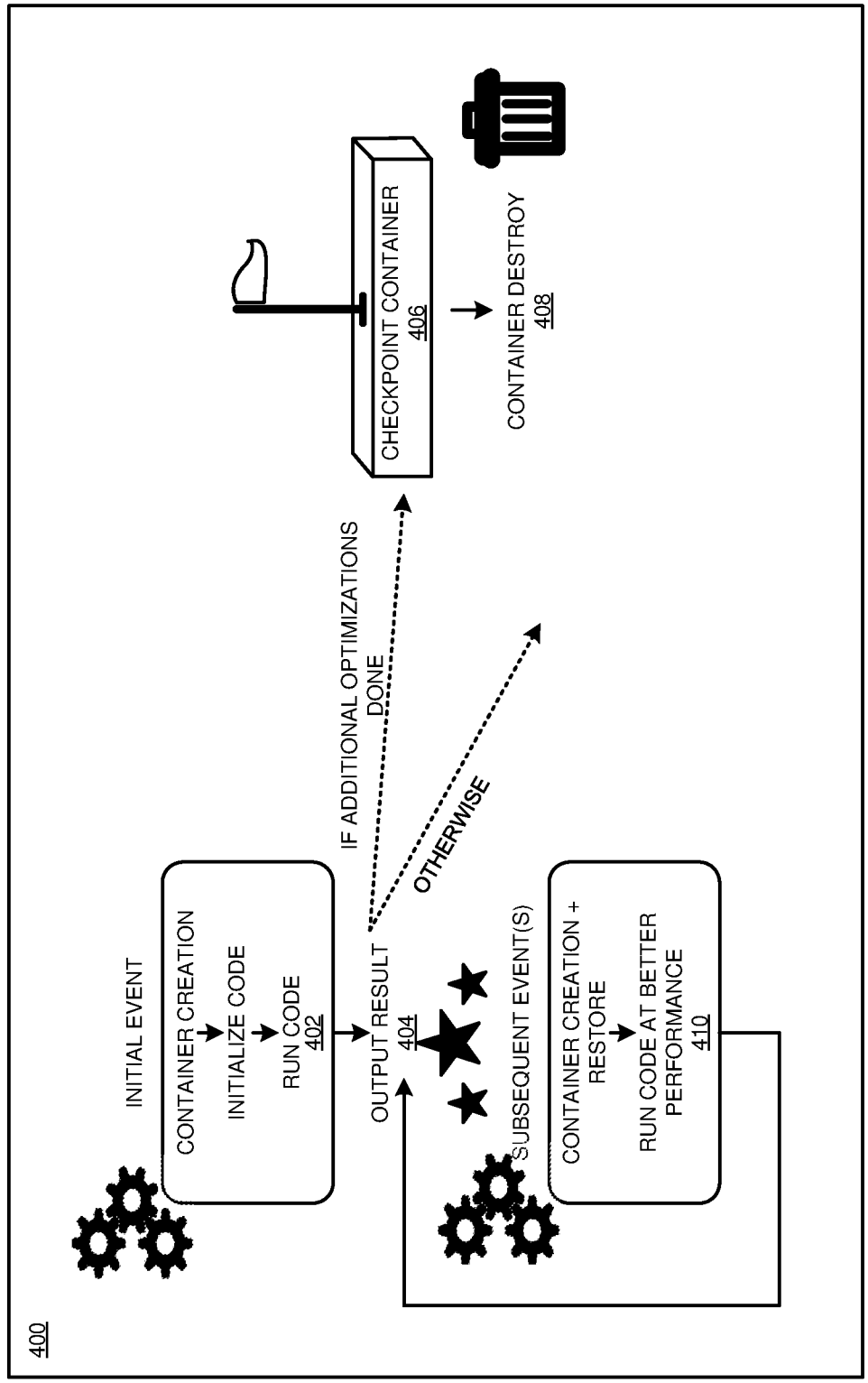
FIG. 4 depicts an example sequence for checkpointing and restoring a container to optimize containerized managed runtime applications in accordance with an illustrative embodiment.

With reference to FIG. 4, this figure depicts an example sequence 400 for checkpointing and restoring a container to optimize containerized managed runtime applications in accordance with an illustrative embodiment. In block 402, during an initial event a system receives managed runtime code, creates a container for the managed runtime code, initializes the managed runtime code, and runs the managed runtime code within the container by a virtual machine to produce an output result 404. If additional optimizations were done by the virtual machine during the running of the code, the system creates a checkpoint container 406 including a memory image of the container containing the optimizations and stores checkpoint container 406 within a storage device. In the illustrated embodiment, the system may create checkpoint container 406 before producing output result 404. In another particular embodiment, the system creates checkpoint container 406 after producing output result 404. After creation of checkpoint container 406, the system performs a container destroy operation 408 to remove the container from the virtual machine. If no optimizations were performed during the run of the managed runtime code, the system performs container destroy operation 408 to remove the container without creating checkpoint container 406.

For one or more subsequent events 410 in which the managed runtime code is to be executed again, the system retrieves checkpoint container 406 and creates a new container by restoring the contents of checkpoint container 406 as the new container. The system then runs the managed runtime code having the code optimizations previously performed using the new container within the virtual machine without again requiring initialization of the managed runtime code.

Figure 5:
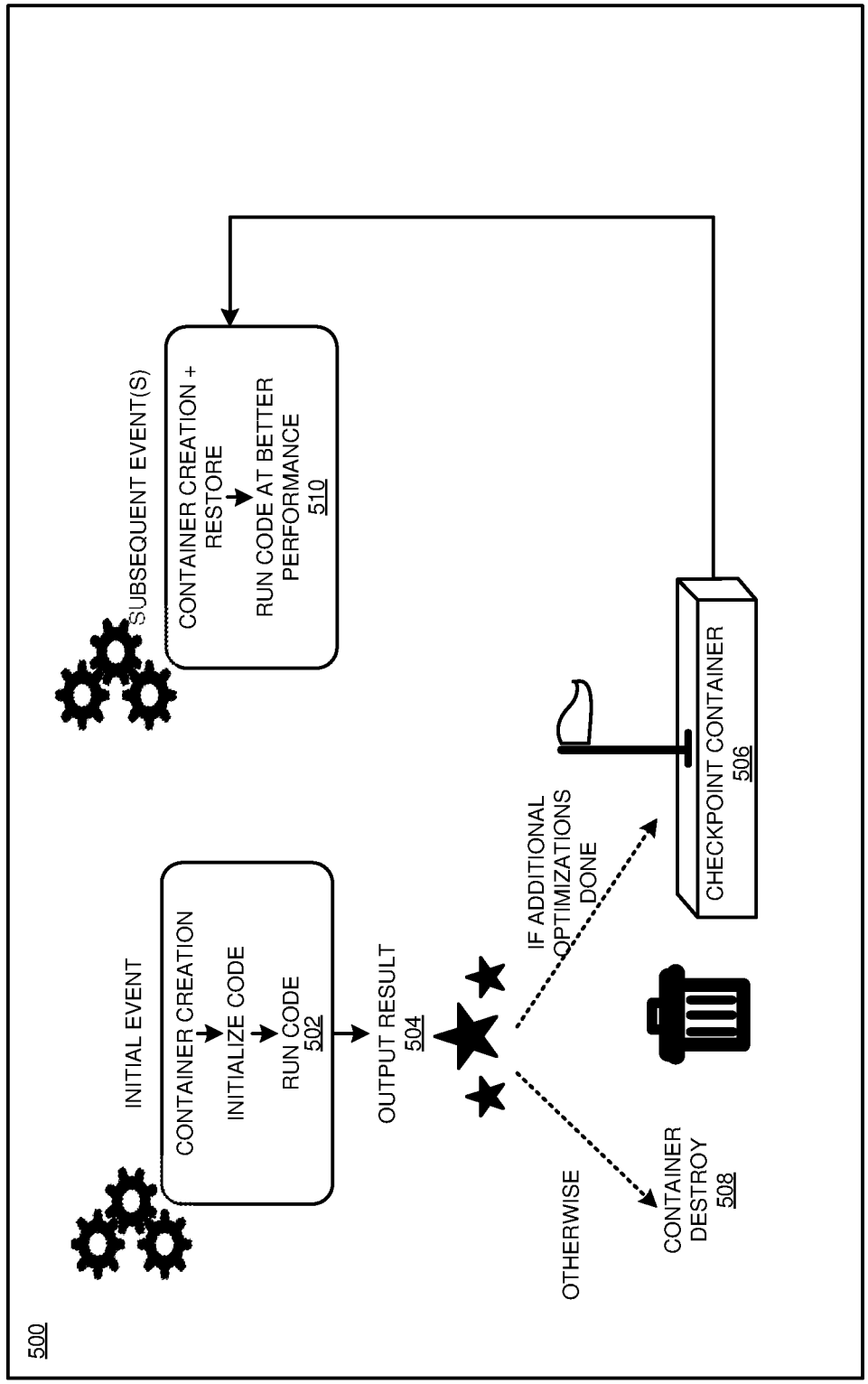
FIG. 5 depicts another example sequence for checkpointing and restoring a container to optimize containerized managed runtime applications in accordance with an illustrative embodiment.

With reference to FIG. 5, this figure depicts another example sequence 500 for checkpointing and restoring a container to optimize containerized managed runtime applications in accordance with an illustrative embodiment. The embodiment of FIG. 5 illustrates a view of a flow of a system over a period of time during checkpointing and restoring of a container.

In block 502, during an initial event at a first time, the system receives managed runtime code, creates a container for the managed runtime code, initializes the managed runtime code, and runs the managed runtime code within the container by a virtual machine to produce an output result 504 at a second time. If additional optimizations were done by the virtual machine during the running of the code, the system creates a checkpoint container 506 at a third time including a memory image of the container containing the optimizations and stores checkpoint container 506 within a storage device. In the illustrated embodiment, the system creates checkpoint container 506 after producing output result 504. In another particular embodiment, the system creates checkpoint container 506 before producing output result 504. After creation of checkpoint container 506, the system performs a container destroy operation 508 at a fourth time to remove the container from the virtual machine. If no optimizations were performed during the run of the managed runtime code, the system performs container destroy operation 508 to remove the container without creating checkpoint container 506.

For one or more subsequent events 510 occurring at a fifth time in which the managed runtime code is to be executed again, the system retrieves the checkpoint container 506 and creates a new container by restoring the contents of checkpoint container 506 as the new container. The system then runs the managed runtime code having the code optimizations previously performed using the new container within the virtual machine without again requiring initialization of the managed runtime code.

Figure 6:
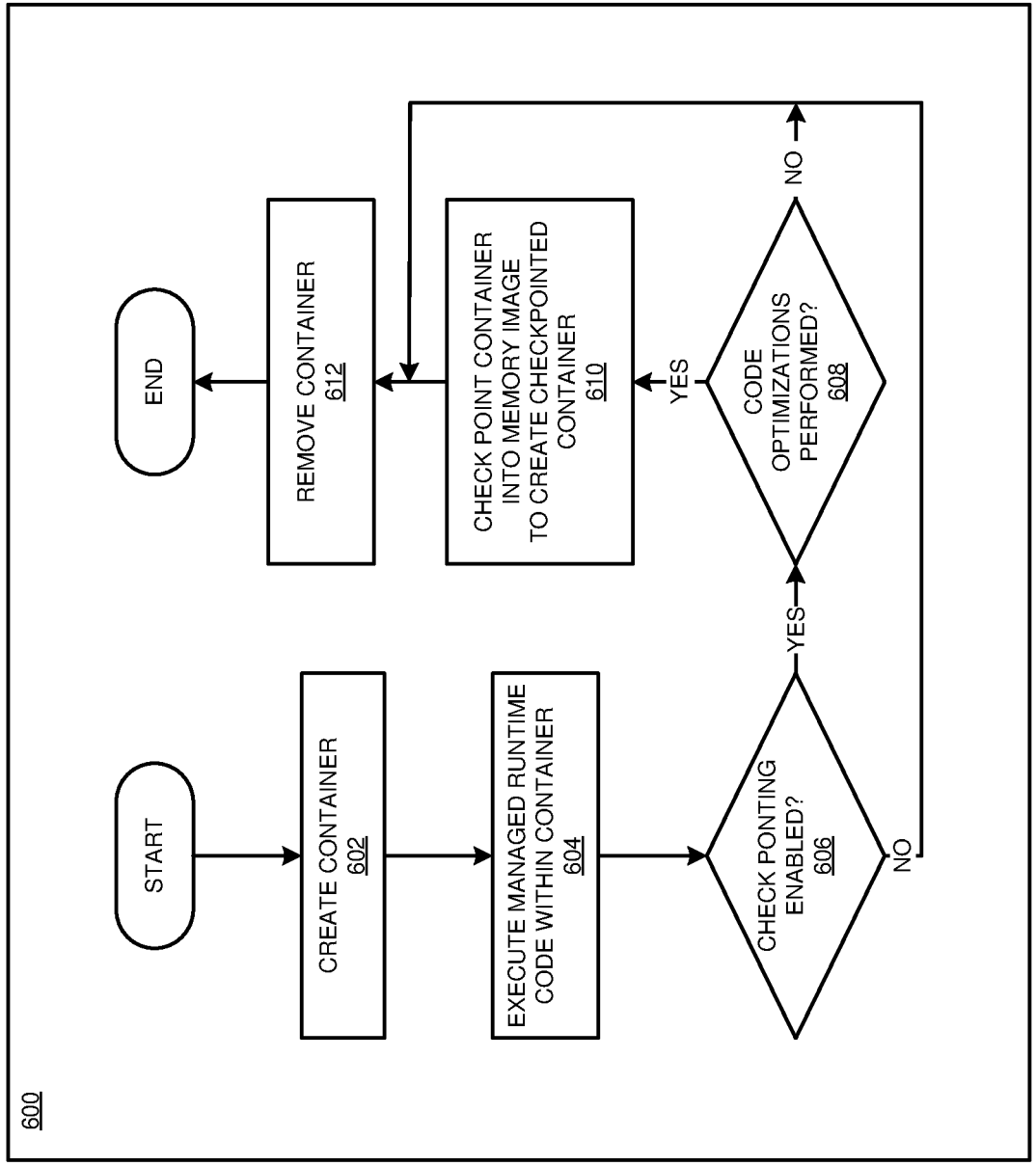
FIG. 6 depicts a flowchart of an example process for checkpointing a containerized managed runtime application in accordance with an illustrative embodiment.

FIG. 6 depicts a flowchart of an example process 600 for checkpointing a containerized managed runtime application in accordance with an illustrative embodiment. In block 602, application 105 receives managed runtime code and creates a container within a virtual machine or other managed runtime environment to be used for executing the managed runtime code. In block 604, application 105 executes the managed runtime code inside the container using the virtual machine. As the code is executed, the virtual machine performs optimizations on the managed runtime code such as JIT compilation and/or other optimizations.

In block 606, application determines whether checkpointing is enabled for a user associated with the managed runtime code. In a particular embodiment, application 105 determines that checkpointing capabilities are enabled for the user responsive to the user paying a fee. If application 105 determines that checkpointing capabilities are enabled, in block 608 application 105 determines whether optimizations have been performed by the virtual machine during the execution of the managed runtime code.

If application 105 determines that optimizations have been performed by the virtual machine during the execution of the managed runtime code, in block 610 application 105 checkpoints the container into a memory image containing the code optimizations to create a checkpointed container and stores the checkpointed container within a storage device. In block 612, application 105 removes the container from the virtual machine.

If application 105 determines in block 606 that checkpointing is not enabled or if application 105 determines in block 610 that no code optimizations were performed during execution of the managed runtime code, process 600 continues to block 612 in which application 105 removes the container from the virtual machine. Process 600 then ends.

Figure 7:
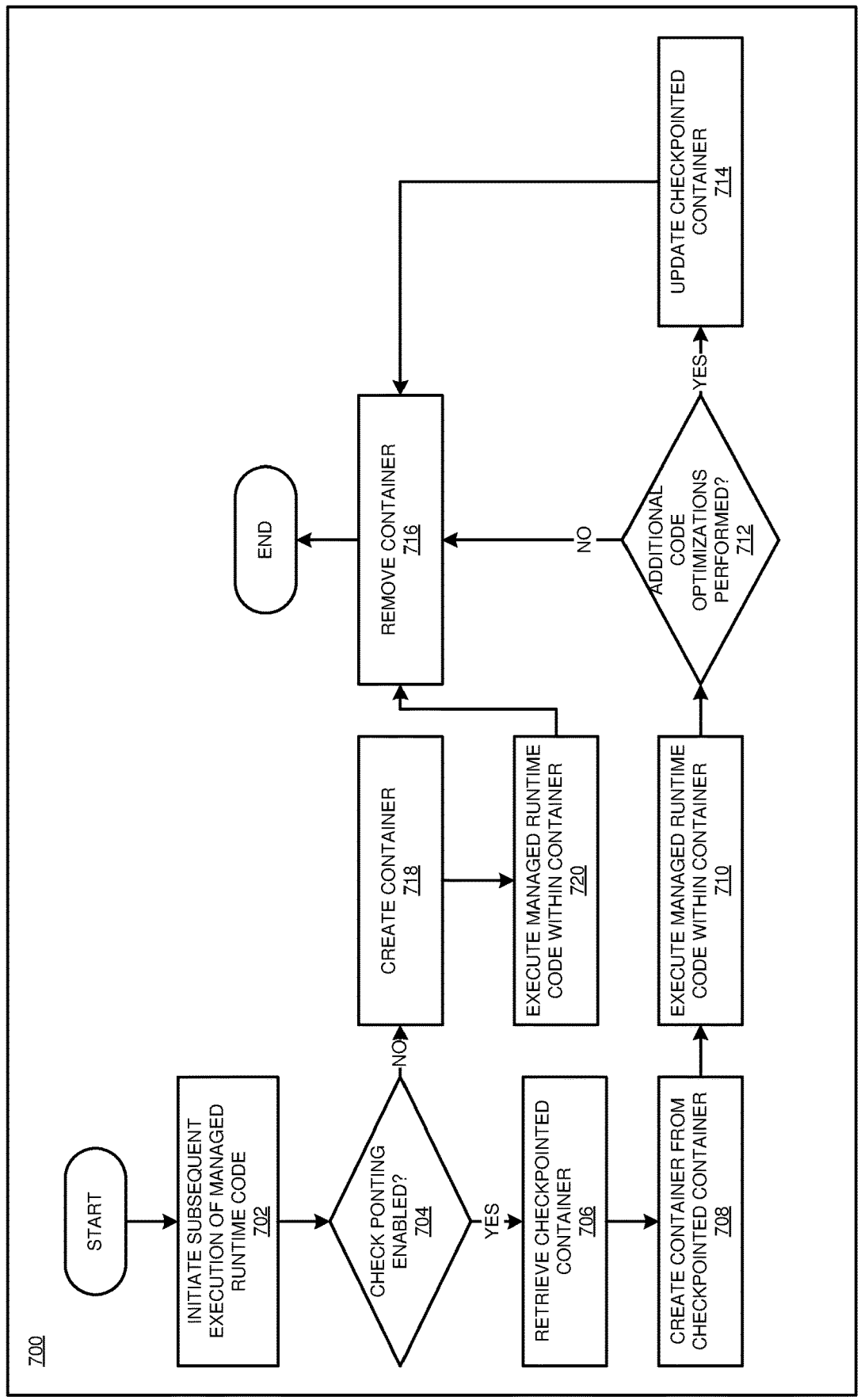
FIG. 7 depicts a flowchart of an example process for restoring a container of a containerized managed runtime application in accordance with an illustrative embodiment.

FIG. 7 depicts a flowchart of an example process 700 for restoring a container of a containerized managed runtime application in accordance with an illustrative embodiment. In the embodiment of FIG. 7, a managed runtime code has been previously executed within a container in a virtual machine, and a checkpointed container containing optimizations of the managed runtime code has been stored in a storage device using one or more operations of process 600 as described with respect to FIG. 6. In block 702, application 105 initiates a subsequent execution of the managed runtime code. In block 704, application 105 determines whether checkpointing capabilities are enabled for a user associated with the managed runtime code.

If application 105 determines that checkpointing capabilities are enabled for the user, in block 706 application 105 retrieves the checkpointed container associated with the managed runtime code from the storage. In block 708, application 105 creates a new container from the checkpointed container by restoring the memory image contained in the checkpointed container to the new container. In the embodiment, the checkpointed container contains any code optimizations performed in previous executions of the managed runtime code. In block 710, application 105 executes the managed runtime code within the container using a virtual machine.

In block 712, application 105 determines if additional code optimizations were performed during execution of the managed runtime code. If application 105 determines in block 712 that additional code optimizations were performed, in block 714 application 105 updates the checkpointed container by copying the current container into a memory image and replacing the checkpointed container with a new checkpointed container including the memory image. In block 716, application 105 removes the current container from the virtual machine and process 700 ends. If application 105 determines in block 712 that no additional code optimizations were performed, process 700 continues to block 716 in which application 105 removes the current container from the virtual machine and process 700 ends.

If application 105 determines in block 704 that checkpointing capabilities are not enabled, process 700 continues to block 718. In block 718, application 105 creates a new container containing unoptimized managed runtime code. In block 720, application 105 executes the managed runtime code within the container using a virtual machine and process 700 continues to block 716. As described above, in block 716 application 105 removes the current container from the virtual machine and process 700 ends.

Thus, a computer implemented method, system or apparatus, and computer program product are provided in the illustrative embodiments for checkpointing and restoring containers to optimize containerized managed runtime applications and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for optimizing containerized applications, the method comprising:
 receiving managed runtime code;
 creating a first container within a managed runtime environment;
 executing, by a virtual machine during a first lifetime of the virtual machine, the managed runtime code in the first container within the managed runtime environment;
 receiving a first report from the virtual machine, wherein the first report indicates whether the virtual machine performed at least one optimization of the managed runtime code by just in time compilation to create optimized managed runtime code during the first lifetime of the virtual machine;
 checkpointing, after the executing of the managed runtime code in the first container and after the first container has been instructed to be removed, the first container into a first memory image to create a first checkpointed container including the optimized managed runtime code;

storing the first checkpointed container;

retrieving, responsive to a determination that a subsequent execution of the managed runtime code is to be performed, the first checkpointed container;

creating a second container from the first checkpointed container by restoring the first memory image to the second container;

executing, by the virtual machine during a second lifetime of the virtual machine, the managed runtime code in the second container within the managed runtime environment; and determining, after the executing of the managed runtime code in the second container and after the second container has been instructed to be removed, responsive to an instruction to to retain the first checkpointed container and to forgo checkpointing the second container based on a second report from the virtual machine, wherein the second report indicates that the virtual machine performed no optimizations during the second lifetime of the virtual machine.

2. The computer-implemented method of claim 1, further comprising:

removing the first container from the managed runtime environment.

3. The computer-implemented method of claim 1, further comprising:

determining that a checkpointing capability is enabled for a user associated with the managed runtime code.

4. The computer-implemented method of claim 3, wherein the checkpointing of the first container is responsive to the determining that checkpointing capability is enabled for the user.

5. The computer-implemented method of claim 1, wherein creating the second container from the first checkpointed container includes restoring the first memory image to the second container.

6. The computer-implemented method of claim 1, further comprising:

executing the optimized managed runtime code in the second container within the managed runtime environment.

7. The computer-implemented method of claim 1, further comprising:

removing the second container from the managed runtime environment.

8. A computer usable program product comprising one or more computer-readable storage devices, and program instructions stored on at least one of the one or more storage devices, the stored program instructions comprising:

program instructions to receive managed runtime code;

program instructions to create a first container within a managed runtime environment;

program instructions to execute, by a virtual machine during a first lifetime of the virtual machine, the managed runtime code in the first container within the managed runtime environment;

program instructions to receive a first report from the virtual machine, wherein the first report indicates whether the virtual machine performed at least one optimization of the managed runtime code by just in time compilation to create optimized managed runtime code during the first lifetime of the virtual machine;

program instructions to checkpoint, after the executing of the managed runtime code in the first container and after the first container has been instructed to be removed, the first container into a first memory image to create a first checkpointed container including the optimized managed runtime code;

program instructions to store the first checkpointed container;

program instructions to retrieve, responsive to a determination that a subsequent execution of the managed runtime code is to be performed, the first checkpointed container;

program instructions to create a second container from the first checkpointed container by restoring the first memory image to the second container;

program instructions to execute, by the virtual machine during a second lifetime of the virtual machine, the managed runtime code in the second container within the managed runtime environment; and program instructions to determine, after the executing of the managed runtime code in the second container and after the second container has been instructed to be removed, to retain the first checkpointed container and to forgo checkpointing the second container based on a second report from the virtual machine, wherein the second report indicates that the virtual machine performed no optimizations during the second lifetime of the virtual machine.

9. The computer usable program product of claim 8, further comprising:

program instructions to remove the first container from the managed runtime environment.

10. The computer usable program product of claim 8, further comprising:

program instructions to determine that a checkpointing capability is enabled for a user associated with the managed runtime code.

11. The computer usable program product of claim 10, wherein the checkpointing of the first container is responsive to the determining that checkpointing capability is enabled for the user.

12. The computer usable program product of claim 8, wherein creating the second container from the first checkpointed container includes restoring the first memory image to the second container.

13. The computer usable program product of claim 8, wherein the program instructions are stored in a computer readable storage device in a data processing system, and wherein the program instructions are transferred over a network from a data processing system.

14. The computer usable program product of claim 8, wherein the program instructions are stored on a server data processing system, and wherein the program instructions are downloaded over a network to a remote data processing system for use in another computer readable storage device associated with the data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive managed runtime code;

program instructions to create a first container within a managed runtime environment;

program instructions to execute, by a virtual machine during a first lifetime of the virtual machine, the managed runtime code in the first container within the managed runtime environment;

program instructions to receive a first report from the virtual machine, wherein the first report indicates whether the virtual machine performed at least one optimization of the managed runtime code by just in time compilation to create optimized managed runtime code during the first lifetime of the virtual machine;

program instructions to checkpoint, after the executing of the managed runtime code in the first container and after the first container has been instructed to be removed, the first container into a first memory image to create a first checkpointed container including the optimized managed runtime code;

program instructions to store the first checkpointed container;

program instructions to retrieve, responsive to a determination that a subsequent execution of the managed runtime code is to be performed, the first checkpointed container;

program instructions to create a second container from the first checkpointed container by restoring the first memory image to the second container;

program instructions to execute, by the virtual machine during a second lifetime of the virtual machine, the managed runtime code in the second container within the managed runtime environment; and program instructions to determine, after the executing of the managed runtime code in the second container and after the second container has been instructed to be removed, to retain the first checkpointed container and to forgo checkpointing the second container based on a second report from the virtual machine, wherein the second report indicates that the virtual machine performed no optimizations during the second lifetime of the virtual machine.

16. The computer system of claim 15, the stored program instructions further comprising:

program instructions to remove the first container from the managed runtime environment.

* * * * *